United States Patent [19]

Gams

[11] 4,377,919
[45] Mar. 29, 1983

[54] HOLDDOWN SYSTEM FOR HORTICULTURAL PLASTIC SHEET

[76] Inventor: Joseph W. Gams, 223 Nicodemus Rd., Reisterstown, Md. 21136

[21] Appl. No.: 314,552

[22] Filed: Oct. 26, 1981

[51] Int. Cl.³ .............................................. A01C 1/00
[52] U.S. Cl. ........................................ 47/1 R; 47/9; 111/4
[58] Field of Search ................. 47/1, 28 R, 9, 32, 48.5, 47/25; 111/4, 99, 98; 294/49, 60, 55.5; 254/131.5, 132; 172/21; 135/15 PE, 15 CF; 29/270, 278

[56] References Cited

U.S. PATENT DOCUMENTS

| 202,909 | 4/1878 | Wilson | 111/4 |
|---|---|---|---|
| 323,419 | 8/1885 | Hiller | 111/4 |
| 887,134 | 5/1908 | Smith | 47/28 |
| 1,276,887 | 8/1918 | Eckart | 47/9 |
| 2,539,271 | 1/1951 | Rianda | 43/124 |
| 2,722,062 | 11/1955 | Phillips | 111/99 |
| 2,877,200 | 3/1959 | Slate | 47/33 |
| 3,290,821 | 12/1966 | Parry | 47/48.5 |
| 3,315,752 | 4/1967 | Pasquini | 172/19 |
| 3,362,106 | 1/1968 | Goldring | 47/56 |
| 3,517,629 | 6/1970 | Bridges et al. | 111/4 |
| 3,890,910 | 6/1975 | Angruner | 111/1 |
| 4,083,101 | 4/1978 | Coller | 29/278 |

FOREIGN PATENT DOCUMENTS

| 850951 | 9/1970 | Canada | 111/4 |
|---|---|---|---|
| 19711 | of 1911 | United Kingdom | 111/99 |
| 1802 | of 1870 | United Kingdom | 135/118 |

Primary Examiner—James R. Feyrer
Assistant Examiner—D. D. DeMille
Attorney, Agent, or Firm—John F. McClellan, Sr.

[57] ABSTRACT

A system for holding down horticultural plastic sheet provides a fastener and tool for driving and removing the fastener; the fastener may be an inverted "L" shape or in "T" shape or in inverted "W" shape according to embodiment with the lower portion wedge shaped and the upper portion held in a form-fitting socket in the head from which it can be removed by sliding in either of two directions or by springing apart of jaws of the tool to release the fastener; special cleat structure helps secure plastic sheet to the earth; in the "T" shaped embodiment and the "W" shaped embodiment, the fastener can hold two or more plastic sheets adjacently laid.

13 Claims, 4 Drawing Figures

HOLDDOWN SYSTEM FOR HORTICULTURAL PLASTIC SHEET

FIELD OF THE INVENTION

This invention relates generally to horticulture and specifically to a hold-down system for plastic sheet laid on the ground in gardening.

BACKGROUND OF THE INVENTION

Plastic sheets laid on the ground are used to grow vegetables, flowers and the like through holes formed in them to inhibit weed growth and conserve moisture generally, in the process.

However, holding plastic sheet down has continued to be a problem because wind develops powerful forces tending to raise the sheet and to tear it, from the time the sheet is new throughout the useful life, which may be several years before deterioration by sunlight if not wind-damaged or wind-removed earlier.

PRIOR ART

Among the hold-down methods tried by various users have been to weigh the plastic sheets down with old tires or rocks or piles of dirt, and to hold it down with fasteners.

Among the disclosures of hold-downs that might be used for plastic sheet are those of the following U.S. Patents:

U.S. Pat. No. 2,539,271 granted to T. A. Rianda on Jan. 23, 1951, discloses a tubular spike with removable handle-equipped shank to set it in the ground;

U.S. Pat. No. 2,877,200 granted to C. C. Slate on Mar. 17, 1979 discloses forms of plate-like pegs with sharp tapered lower ends and overhang limiting downward insertion in the ground;

U.S. Pat. No. 3,315,752 granted to E. Pasquini on Apr. 25, 1967, discloses a spike with overhanging top that could hold a plastic sheet;

U.S. Pat. No. 3,362,106 granted to J. E. Goldring on Jan. 9, 1968, discloses two forms of hold-down that could be used for plastic sheets;

U.S. Pat. No. 3,890,910 granted to R. Angruner on June 24, 1975, discloses a wicket-shaped hold-down for plastic sheets, and staple-gun for driving it.

OBJECTS OF THE INVENTION

However, fasteners known to date have not included a system according to principal objects of this invention, in which the fasteners can be safely forced in place by a combination of hand and foot power, in which the fasteners automatically release from an instrument for applying them either with application of testing force or freely, in which the fasteners provide optimum earth-holding with ease of application and removal, in which the fasteners can hold either one sheet or adjacent edges of sheets, and in which fastener spacing can be made uniform by application of a special heavy duty type fastener.

Further objects are to provide a system as described in which the fasteners hold broad areas of sheet, which are economical to purchase and to use, which are durable and attractive in appearance, and which can be made in various colors.

Still further objects are to provide a system as described in which the applicator tool can be used to loosen the fasteners from the earth for removal, and in which the tool helps align the fasteners during application.

In brief summary given as cursive description only and not as limitation the invention includes a wedge-shaped fastener with cleat in the form of overhanging top transverse to the plane of the wedge shape, and an applicator tool having an inverted truncate wedge-shaped socket including resiliently releasing jaws holding the wedge-shaped fastener in a grip applicable and releasible either by springing in a vertical direction or by sliding aside.

BRIEF DESCRIPTION OF THE DRAWINGS

The above and other objects and advantages of the invention will become more readily apparent on examination of the following description including the drawings in which the characters refer to like parts.

and

Figure 4:
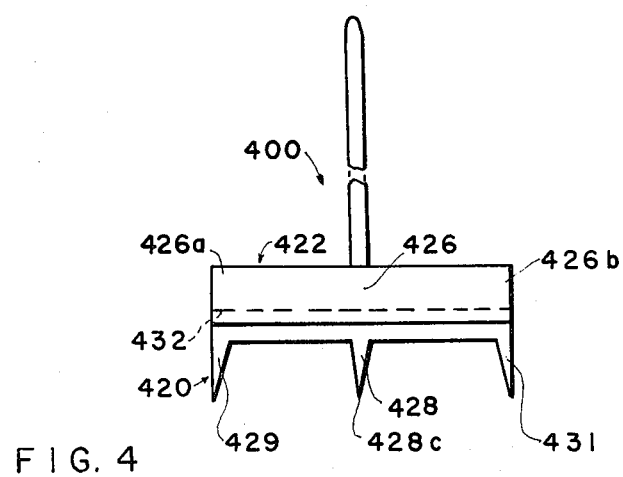

FIG. 4 is a front elevational view of a further embodiment.

DETAILED DESCRIPTION OF THE DRAWINGS

Figure 1:
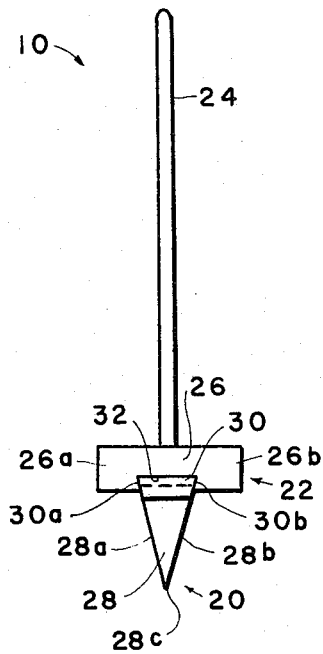
FIG. 1 is an elevational view of the system assembled for use.

FIG. 1 shows the invention in embodiment 10 as comprising a fastener 20 and a tool 22 for applying the fastener, and for helping remove it also, when desired.

An elongate handle 24 proportioned for upright disposition while the tool is applying a fastener perpendicularly joins the fastener head 26 which has a projection 26a, 26b on either side of the handle, preferably, forming a rest for driving fasteners into earth, using hand power and/or foot power, as desired.

The fastener 20 is symmetrical about the vertical centerline and preferably has a wedge shaped portion 28 of sheet stock or the like with opposed edges 28a and 28b inclined downwardly to a chisel point 28c. A plastic sheet-engaging portion 30 extends laterally from the upper end of the wedge-shaped portion.

The head 26 of the tool has a socket 32 fitting the upper end of the fastener and holding it. Preferably the socket is all the way through the tool head affording means for slidably removing or inserting fasteners in either direction transversely of the tool head. Preferably, also the laterally extending portion 30 has a respective side 30a, 30b in-plane with each of the two in chisel edges 28a, 28b, and the socket fits this also, for greater holding power and easier removal.

Material for the head may be resilient plastic such as polystyrene, cast or otherwise formed, and colored brightly, if desired. The resiliency should be sufficient to spring the fastener free downwardly with application of two or three pounds force. Such force may preferably be applied by foot directly on the fastener, the fastener and tool either being slid relative to each other so that the top of the fastener is exposed, or else a fastener laterally extending plastic sheet engaging portion 30 proportioned for extending beyond the tool on one or both sides.

Figure 2:
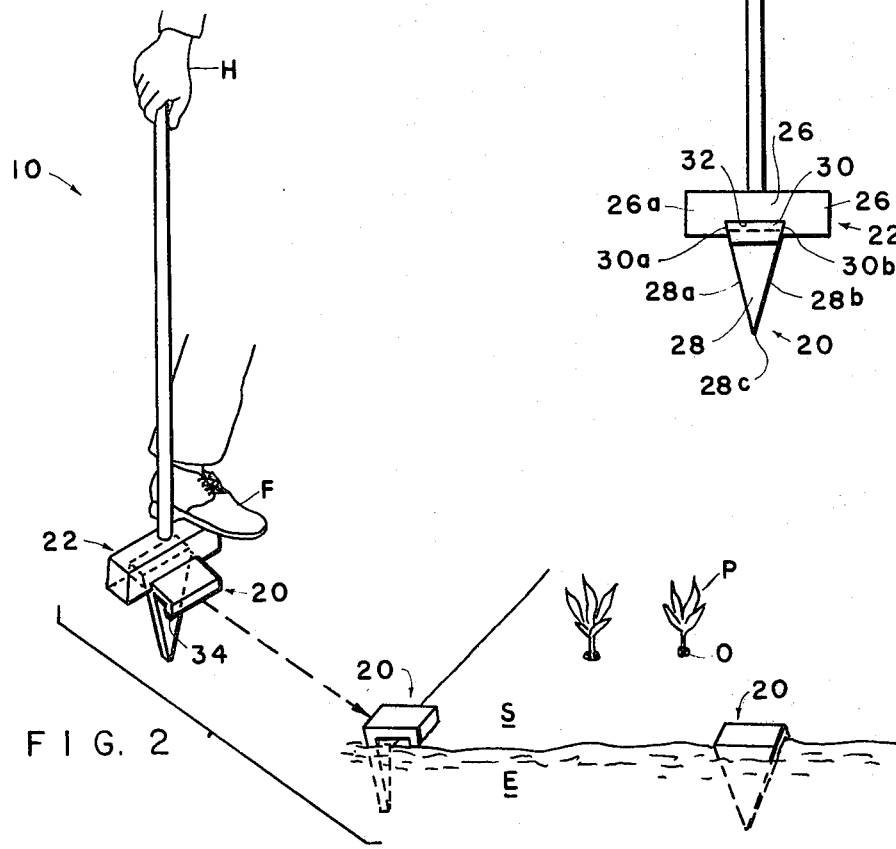
FIG. 2 is a perspective view indicating successive positions in application of a fastener for holding down a horticultural plastic sheet.

FIG. 2 shows preferred relations of the fastener 20 and tool when associated and aspects of the fastener when free of the tool and when in place in earth E holding down a plastic sheet S used in growing plants P through openings in the sheet. A plurality of fasteners would normally be used, spaced along the edges of the plastic sheet.

A user's hand H and/or foot F may be used on the tool 22 to drive the fastener 20, or the foot may drive the exposed portion of the fastener directly. A cleat 34 on the underside of the fastener laterally extending portion assures higher gripping force per unit area on the plastic sheet.

Figure 3:
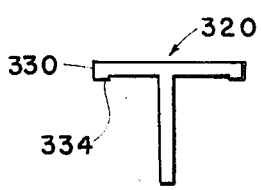
FIG. 3 is an end view of a second embodiment fastener.

FIG. 3 shows an embodiment 320 of the fastener which can hold adjacent edges of two plastic sheets at once. This is in "T" shape with a cleat 334 under the end of each of the laterally extending portions 330. Other characteristics may be as described. Material for this and other embodiments of the fastener may be polyethylene or other suitable weather-resistant equivalent, or even metal in lighter proportions than shown.

FIG. 4 shows a further embodiment 400 of fastener 420 and tool 422. In this the socket 432 is the same shape but extends longitudinally through the head 426. In end-view the assembly may be the same as in the first Figure, but in the side view shown here the lateral extension 426a, 426b from the fastener downward wedge-shaped part 428 may each terminate in a respective downward wedge-shape part 429, 431 like, and parallel with, the first. Connecting the fasteners together in this manner provides greater ease in handling and faster installation of a plurality of fasteners.

In addition, the bottom ends, 428c indicated, of the wedges may be pointed instead of chisel-shaped, making the fastener particularly useful for marking-off locations in the plastic as well as for hold-downs.

Dimensions of the fasteners may be 1 inch to 3 inches (2.5 to 7.5 cm) deep by 3 inches to 8 inches (7.5 to 20 cm) long and by 2 to 6 inches (5 to 15 cm) across the overhang. The cleats may be plural instead of a single flange, and may be pointed for better gripping. Thickness may be ¼ to ½ inch.

The tool may have a handle 36 inches (86 cm) long, and a head length of 8 inches (20 cm), depth of 3 inches (7.5 cm) socket depth of ¼" to 1", (0.6 to 2.5 cm) depending on fastener thickness to be retained, and head thickness of ¼ inch measured transverse to length.

In removing the fastener the head may be engaged with it and rocked in various directions to loosen grip of the earth on the wedge portion. Straight pull up applies testing force.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A system for holding down plastic-sheet laid on the ground in earth-horticulture, comprising: a fastener for holding down said plastic sheet and a tool for applying the fastener to said plastic sheet by driving the fastener into earth; the fastener having: a wedge-shaped portion of sheet stock with two edges inclined downwardly to a point, a laterally extending plastic-sheet-engaging portion extending to an end outwardly from the upper end of the wedge-shaped portion; the tool having: an elongate handle proportioned for upright disposition during said applying: a head on the lower end of the handle, and the head having jaw structure defining a socket in the head fitting the uppermost part of the wedge-shaped portion.

2. A system as recited in claim 1, and a downward cleat on the outer end of the laterally extending plastic-sheet-engaging portion.

3. A system as recited in claim 1, means for sliding release of the fastener from the socket in either of two directions, comprising the socket extending entirely through the head.

4. A system as recited in claim 1, means for releasing the fastener from the socket, comprising the head being resilient for releasing the fastener from the jaw structure when the fastener is in said socket.

5. A system as recited in claim 1, the head having structure permitting application of foot-pressure in a downward direction for said driving of the fastener into earth.

6. A system as recited in claim 5, said head structure comprising the head projecting in opposite directions from the elongate handle.

7. A system as recited in claim 6, means for sliding release of the fastener from the socket, comprising said socket extending transversely through the head.

8. A system as recited in claim 6, means for sliding release of the fastener from the head comprising said socket extending longitudinally through the projections of the head.

9. A system as recited in claim 8, the fastener including a plurality of said wedge-shaped portions.

10. A system as recited in claim 1, said laterally-extending plastic-sheet-engaging portion having a respective side in-plane with each of said two edges inclined downwardly to a point.

11. A system as recited in claim 10, and said fitting of the socket including an edge-in-plane with each said side laterally extending plastic-sheet-engaging portion.

12. A system as recited in claim 1, the fastener having means for holding down portions of two said plastic sheets, comprising the laterally extending plastic-sheet-engaging portion forming a "T" shape with the wedge-shaped portion of sheet stock.

13. A system as recited in claim 1, each laterally extending plastic-sheet-engaging portion forming a "T" shape with the wedge-shaped portion of sheet stock and means permitting application of pressure directly on the fastener when in the tool, comprising each said lateral extension being clear of said head of the tool.

* * * * *